Dec. 2, 1958     F. KOPPELMANN     2,863,110
MECHANICAL CONVERTERS
Original Filed April 13, 1950     2 Sheets—Sheet 1
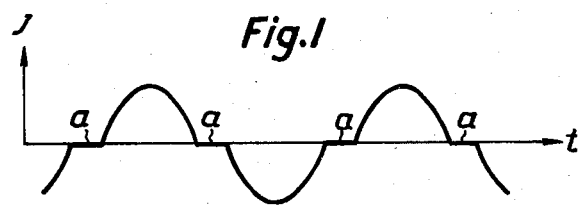
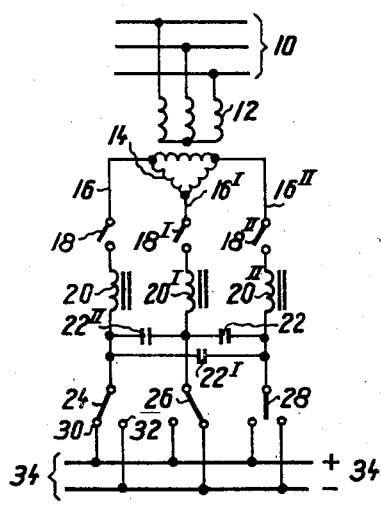
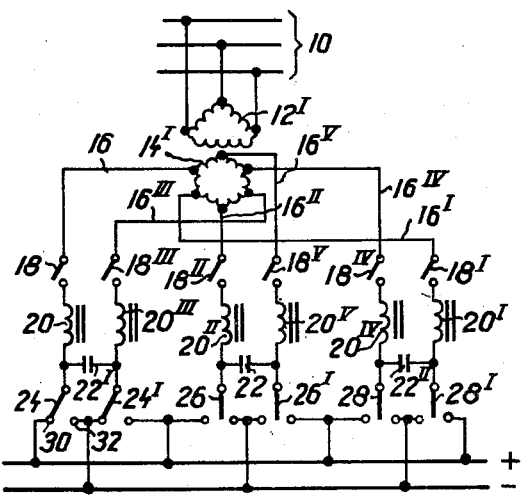
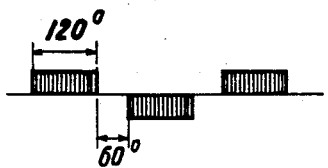
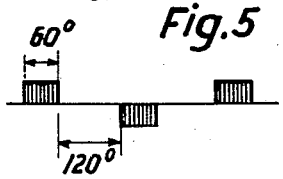
Inventor:
Floris Koppelmann
by: Michael S. Striker
Attorney

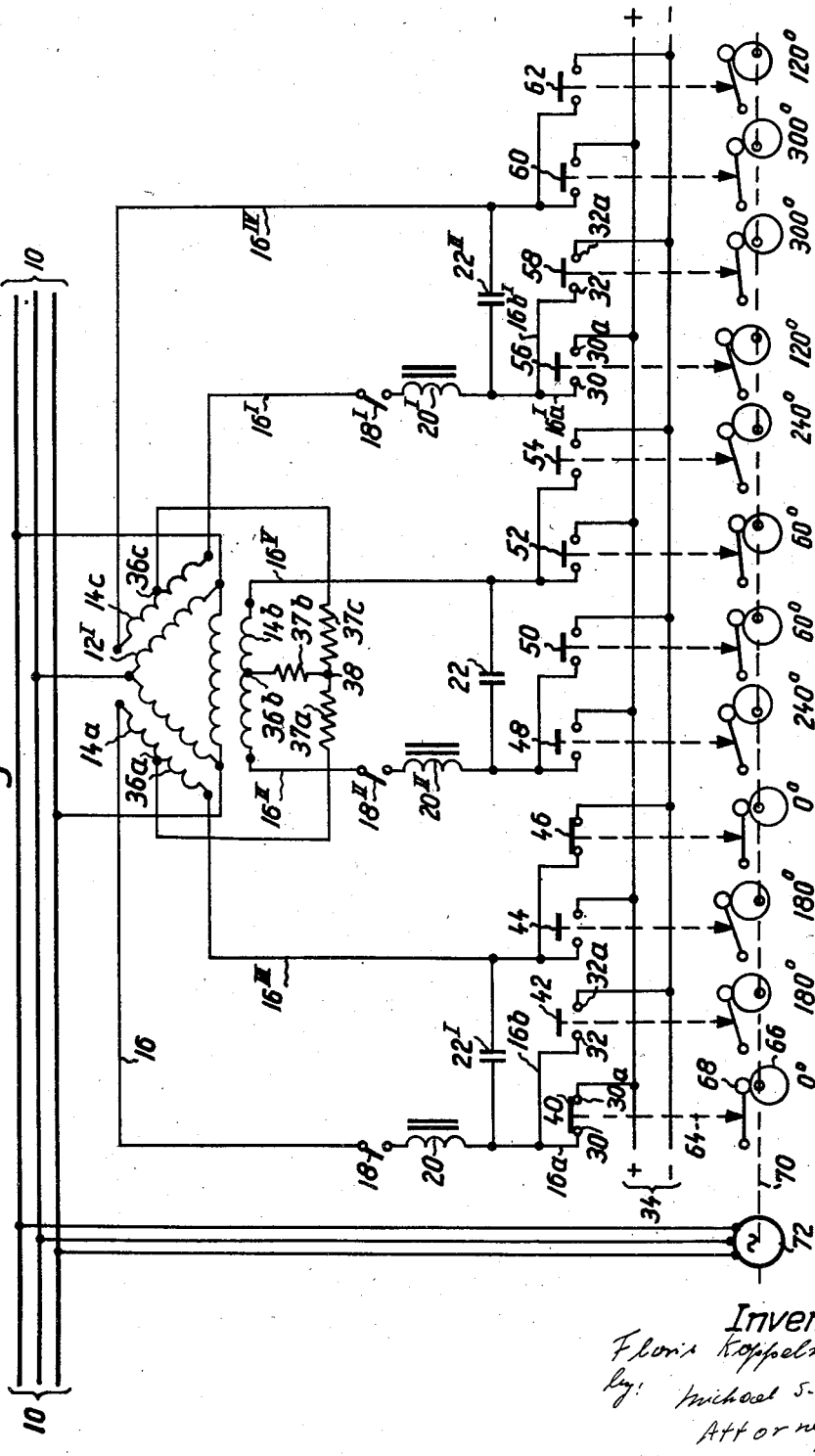

United States Patent Office 2,863,110
Patented Dec. 2, 1958

2,863,110

MECHANICAL CONVERTERS

Floris Koppelmann, Berlin-Reinickendorf, Germany, assignor to Licentia Patent-Verwaltungs, G. m. b. H., Berlin, Germany, a corporation of Germany Original application April 13, 1950, Serial No. 155,585, now Patent No. 2,666,102, dated January 12, 1954. Divided and this application October 21, 1952, Serial No. 315,893

Claims priority, application Germany November 4, 1949

11 Claims. (Cl. 321—48)

The present invention relates to an arrangement for converting alternating current into direct current and more particularly for mechanically converting a three-phase current into direct current.

This application is a division of my co-pending application Serial No. 155,585, filed April 13, 1950, entitled "Mechanical Rectifier," now Patent No. 2,666,102.

It is an object of the invention to provide an arrangement which has a transformer of simple design and a high output.

It is another object of the present invention to provide an arrangement capable of being greatly overloaded.

An arrangement according to the present invention comprises in combination a three-phase transformer having primaries adapted for connection to a three-phase current supply, and a secondary winding for supplying a multi-phase current, a plurality of movable contacts connected, respectively, to the secondary winding so as to be fed, respectively, with the phases of the multi-phase current, a plurality of pairs of stationary contacts cooperating, respectively, with the movable contacts, and a D. C. line having a positive and a negative terminal, one of the stationary contacts of each of the pairs being connected to the positive terminal, the other of the stationary contacts of each of the pairs being connected to the negative terminal.

In one embodiment of the present invention the secondary winding is formed as a six-phase winding having six junctions connected, respectively, to six phase connections to which movable contacts are connected, respectively.

Preferably three condensers are connected, respectively, between the phase connections connected to opposite ones of the six junctions.

Preferably choke coils and, if desired, switches are arranged, respectively, in the phase connections.

Preferably, the movable contacts move together in pairs.

In another embodiment of the present invention the transformer has separate single phase secondaries which are preferably connected at the midpoint thereof to a common star point through resistances, respectively.

Preferably three chokes are connected, respectively, in series to the secondaries and three condensers are connected, respectively, in shunt to the series connections of the chokes and the secondaries.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Fig. 1 is a current diagram for the explanation of the invention;

Fig. 2 is a diagram showing a converting arrangement;

Fig. 3 is a diagram for the explanation of the operation of the arrangement shown in Fig. 2;

Fig. 4 is a diagram showing another converting arrangement;

Fig. 5 is a diagram similar to Fig. 3 for the explanation of the operation of the arrangements shown in Fig. 4 and Fig. 6; and Fig. 6 is a converting arrangement according to the invention.

Referring now to the drawings, and first to Fig. 1, the current $J$ is plotted against the time $t$ which flows in a mechanical rectifier comprising a choke inserted in the alternating current circuit which flattens the current at the points where it becomes zero so that the current is practically zero for approximately one millisecond as shown at $a$ in Fig. 1. During this time the contacts of the mechanical rectifiers are opened and closed. The contacts are moved synchronously with the alternating current to be converted, for instance by means of a synchronous motor and eccentrics as more fully described in the parent application Serial No. 155,585 mentioned hereinabove.

Whereas in mercury vapor rectifiers a voltage of 10 to 20 volts is consumed in the arc, in mechanical rectifiers practically no voltage drop is encountered at the contacts so that mechanical rectifiers even for small direct voltages can be designed which have a high efficiency. The negligibly small voltage drop at the contacts, which for instance amounts to a few millivolts, renders it possible to provide a bridge connection instead of the star connection of the transformer which is customary in connection with mercury vapor rectifiers. In the bridge connection the current to be rectified is twice led over contacts and the bridge connection involves the advantage that the transformer of the rectifier is of simple design and has a high efficiency.

Fig. 2 shows a three-phase bridge connection for mechanical rectifiers involving one choke for each phase. In Fig. 2 the three-phase line is connected to the primary 12 of the transformer which is connected in star. The secondary 14 of the transformer is connected in delta. In each phase connection 16, $16^I$, $16^{II}$ is connected, respectively, a switch 18, $18^I$, $18^{II}$ and a choke 20, $20^I$, $20^{II}$, each of which preferably comprises a single phase winding on an iron core. The switches 18, $18^I$, $18^{II}$, can be single-pole switches which may be coupled with one another. Preferably the switches 18, $18^I$, $18^{II}$ are designed as high-speed switches which rapidly interrupt the current in case of a short circuit between the phases. Condensers 22, $22^I$, $22^{II}$ are inserted between the phase connections, 16, $16^I$, $16^{II}$ and serve for extinguishing any short circuit. 24, 26 and 28 are the movable contacts of the rectifiers. Each of the movable contacts 24, 26, 28 cooperates with a pair of stationary contacts such as 30 and 32 which are conncted, respectively, to the positive and to the negative bus bar of the direct current line 34.

The operation of this device is as follows: Each of the contacts 24 to 28 is moved between its cooperating stationary contacts synchronously in the rhythm of the alternating frequency and with a phase difference amounting to 120° between the actions of the contacts 24 to 28. As will be seen from Fig. 2, when contact 24 is in the position making contact with contact 30 connected to the positive bus bar, contact 26 is in contact with the stationary contact connected to the negative bus bar and contact 28 is in the middle position between its stationary contacts. Each phase connection 16, $16^I$, $16^{II}$ is alternately connected to the positive and negative bus bar of the direct current line 34 and the contacts 24 to 28 are kept in contact with each cooperating stationary contact such as 30 and 32 for 120° of the alternating current cycle as shown in Fig. 3. This period of 120° is followed by 60° during which the phase connection 16 does not carry any current. After that the contact such as 24 makes contact with the other stationary contact connected to the negative bus bar again for 120° which is followed again by 60° during which no current flows, etc. Thus it will be seen that with this connection the chokes 20, $20^I$, $20^{II}$ are traversed by currents for 120° whereas the gaps between the currents amount to 60° during which the currents and the saturation of the chokes have to be reversed.

It has been found in practice that in many cases a period of 60° is insufficient for reversing the currents and the saturations of the chokes which leads to difficulties of various types in the operation. For instance, the rectifiers can only be slightly overloaded, they are difficult to adjust, and the safety against short circuits is reduced by the fact that the chokes have to be kept small.

For this reason a six-phase bridge connection instead of a three-phase one is used such as shown in Fig. 4 of the drawings. In this figure a three-phase alternating current line 10 is connected to the primary 12' of the transformer which is connected in delta. The secondary 14' of the transformer is designed as a six-phase winding the junctions of which are connected, respectively, to phase or anode connections 16, $16^I$ . . . . $16^V$, each having a switch 18, $18^I$ . . . . $18^V$ and a choke 20, $20^I$ . . . . $20^V$. The condensers 22, $22^I$, $22^{II}$ are each connected between the phase connections such as 16 and $16^{III}$ starting from opposite points of the secondary 14'. Each phase connection 16 to $16^V$ is connected to a movable contact 24, 24', 26, 26', 28, and 28' which moves between the stationary contacts, such as 30 and 32, connected, respectively, to the positive and to the negative bus bar of the direct current line 34. The movable contacts 24 and 24' move together and the same holds for the movable contacts 26 and 26', and 28 and 28'. The movable contacts are controlled so that the current in each phase connection 16 to $16^V$ is closed for a time equivalent to 60° of a cycle in one direction and to 60° in the opposite direction these periods being separated from each other by an interval of 120° during which no current flows in the phase connection, as shown in Fig. 5 of the drawings. By this means sufficient time is gained for commutating the current so that the rectifiers are simpler to operate and the safety against short circuits is increased. The disadvantage of this device is that a six-pole switch 18, $18^I$ etc., and six chokes 20, $20^I$ etc., are required and that the transformer is more complicated because its secondary 14' has to be designed as a six-phase winding.

The invention overcomes this drawback by using a much simpler six-phase connection which is shown in Fig. 6.

In Fig. 6, 10 is again the three-phase A. C. line and 12' the delta-connected primary of the transformer which is connected to the three-phase A. C. line 10. The secondary of the transformer comprises three single phase windings 14a, 14b, 14c cooperating, respectively, with the windings of the delta-connected primary 12'. The mid points 36a, 36b and 36c of the secondaries 14a, 14b, and 14c are connected, respectively, to one terminal of preferably equal high-ohmic resistances 37a, 37b, and 37c, respectively, the other terminals of which are connected to a common star point 38. The terminals of secondary 14a are connected, respectively, to the phase connections 16 and $16^{III}$, the terminals of secondary 14b to the phase connections $16^{II}$ and $16^V$, and the terminals of secondary 14c to the phase connections $16^I$ and $16^{IV}$. In phase connection 16 a switch 18 and a choke 20 are inserted, in phase connection $16^I$ a switch $18^I$ and a choke $20^I$ and in phase connection $16^{II}$ a switch $18^{II}$ and a choke $20^{II}$ are inserted. After the interconnected switches and chokes, the phase connections 16 and $16^{III}$ are bridged by a condenser $22^I$, phase connections $16^{II}$ and $16^V$ by a condenser 22, and phase connections $16^I$ and $16^{IV}$ by a condenser $22^{II}$. Each phase connection 16, $16^I$ etc., ends in two branches such as 16a and 16b, $16^Ia$ and $16^Ib$ etc., leading to stationary contacts such as 30 and 32. It will be seen from Fig. 6 that twelve such stationary contacts are provided. Associated with each stationary contact is another stationary contact such as 30a, 32a etc., being arranged on the same level. The contacts 30a and 32a are connected, respectively, to the positive and to the negative bus bar of the D. C. line 34, and so on for the other contacts. Movable contact bridges 40, 42 . . . 60, 62 are arranged to bridge the stationary contacts 30, 30a, 32, 32a etc. As will be seen from Fig. 6 the bridges 40 and 46 are at a certain moment in contact with their stationary contacts whereas the other bridges are at this moment not in contact with their stationary contacts but separated from them by different distances as more fully described in the parent application Serial No. 155,585 mentioned hereinabove, and particularly Fig. 4 thereof. Each contact bridge such as 40 is connected to a rod such as 64 which is operated upon by an eccentric such as 66 through a pivoted lever such as 68; the eccentrics are arranged on a common shaft 70 which is driven by a three-phase motor 72 synchronously with the three-phase current to be converted. The motor 72 is preferably connected to the line 10 carrying the three-phase A. C. current to be converted. The design of the bridges 40 to 62 and the driving mechanism thereof is more fully described in detail in connection with Fig. 4 of the parent application Serial No. 155,585 mentioned hereinabove. It should be understood, however, that at a certain instant the bridge 40 connects the phase connection 16 to the positive bus bar of the direct current line 34 and the bridge 46 connects the phase connection $16^{III}$ to the negative bus bar, whereas the bridges 42 and 44 belonging to the other end branches of the phase connections 16, $16^{III}$ are in their position farthest apart from the stationary contacts. The other bridges are in certain mean positions not quite so far apart from their stationary contacts as bridges 42 and 44, and the eccentrics 66 etc. are so arranged on the common shaft 70 that each phase connection 16 etc. is connected to a bus bar of the direct current line 34 for a time period equivalent to 60° of a cycle of the A. C. current followed by 120° during which the respective phase connection does not carry any current. In consequence thereof the current diagram shown in Fig. 5 holds also for Fig. 6. But the arrangement shown in Fig. 6 is simpler than that shown in Fig. 4 in that the transformer has not a six-phase secondary winding and that the switches 18, etc. and chokes 20, etc. are only provided three-fold instead of six-fold as in Fig. 4.

The star point 38 which has been created by means of the high-ohmic resistances 37a, 37b, and 37c serves to control the potentials of the three phases during the intervals in which they do not carry any current.

The arrangement shown in Fig. 6 requires twelve movable contact bridges which, however, involves a disadvantage only at small outputs. Owing to the greater time period available for commutating the current (120° instead of 60°) larger currents can be recitfied. The voltage at the contacts is, with equal direct line voltage, only half as much as with a three-phase connection so that with a six-phase connection twice the voltage, for instance 800 volts, can be generated as compared with three-phase connections. Thus it is seen that with the six-phase connection the units may be designed for much higher powers so that in large plants the number of movable contacts is smaller with a six-phase connection than with a three-phase connection in which several small units have to be connected in parallel or in series.

It will be understood that each of the elements described above, or two or more together, may also find a useful application in other types of arrangement for converting alternating current into direct current differing from the types described above.

While I have illustrated and described the invention as embodied in an arrangement for mechanically converting three-phase current into direct current, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention.

What I claim as new and desire to secure by Letters Patent is:

1. An arrangement for mechanically converting an alternating current into direct current comprising, in combination, a transformer having primary windings connected in polyphase and secondary windings connected in single phase, each of said secondary windings respectively having two opposite end terminals; electrical impedance means connected in circuit with at least a portion of each of said secondary windings to form a six-phase bridge connection; a plurality of pairs of switches, each of said switches being movable between circuit opening position and circuit closing position, each of said end terminals of said secondary windings being respectively connected to one side of a different pair of said plurality of pairs of switches; a plurality of saturable reactors, each of said reactors being connected respectively, between one of said end terminals of each of said secondary windings and its respective pair of switches; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

2. An arrangement for mechanically converting a three-phase current into direct current comprising, in combination, a transformer having three primary windings connected in polyphase and three secondary windings connected in single phase, each of said secondary windings respectively having two opposite end terminals; electrical impedance means connected in circuit with at least a portion of each of said secondary windings to form a six-phase bridge connection; a plurality of pairs of switches, each of said switches being movable between circuit opening position and circuit closing position, each of said end terminals of said secondary windings being respectively connected to one side of a different pair of said plurality of pairs of switches; three saturable reactors, each of said three reactors being connected respectively, between one of said end terminals of each of said secondary windings and its respective pair of switches; means for moving each of said switches between circuit opening and circuit closing positions in synchronism with said three-phase current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

3. A arrangement for mechanically converting an alternating current into direct current comprising, in combination, a transformer having primary windings connected in polyphase and secondary windings connected in single phase, each of said secondary windings respectively having two opposite end terminals; electrical impedance means connected in circuit with at least a portion of each of said secondary windings to form a six-phase bridge connection; a plurality of pairs of switches, each of said switches being movable between circuit opening position and circuit closing position, each of said end terminals of said secondary windings being respectively connected to one side of a different pair of said plurality of pairs of switches; a plurality of saturable reactors, each of said reactors being connected respectively, between one of said end terminals of each of said secondary windings and its respective pair of switches; a group of capacitors, each of said capacitors being respectively connected between the two pairs of switches connected to the same one of said secondary windings; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

4. An arrangement for mechanically converting a three-phase current into direct current comprising, in combination, a transformer having three primary windings connected in polyphase and three secondary windings connected in single phase, each of said secondary windings respectively having two opposite end terminals; electrical impedance means connected in circuit with at least a portion of each of said secondary windings to form a six-phase bridge connection; a plurality of pairs of switches, each of said switches being movable between circuit opening position and circuit closing position, each of said end terminals of said secondary windings being respectively connected to one side of a different pair of said plurality of pairs of switches; three saturable reactors, each of said three reactors being connected respectively, between one of said end terminals of each of said secondary windings and its respective pair of switches; a group of capacitors, each of said capacitors being respectively connected between the two pairs of switches connected to the same one of said secondary windings; means for moving each of said switches between circuit opening and circuit closing positions in synchronism with said three-phase current to be rectifier and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

5. An arrangement for mechanically converting an alternating current into direct current comprising, in combination, a transformer having primary windings connected in polyphase and secondary windings connected in single phase, each of said secondary windings respectively having two opposite end terminals; a set of resistors, each of said resistors having a substantially high resistance which is equal to the resistance of the other resistors, each of said resistors also being respectively connected between the midpoint of one of said secondary windings and a common junction point of said resistors to form a six-phase bridge connection; a plurality of pairs of switches, each of said switches being movable between circuit opening position and circuit closing position, each of said end terminals of said secondary windings being respectively connected to one side of a different pair of said plurality of pairs of switches; a plurality of saturable reactors, each of said reactors being connected respectively, between one of said end terminals of each of said secondary windings and its respective pair of switches; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

6. An arrangement for mechanically converting a three-phase current into direct current comprising, in combination, a transformer having three primary windings connected in polyphase and three secondary windings connected in single phase, each of said secondary windings respectively having two opposite end terminals; a set of resistors, each of said resistors having a substantially high resistance which is equal to the resistance of the other resistors, each of said resistors also being respectively connected between the midpoint of one of said secondary windings and a common junction point of said resistors to form a six-phase bridge connection; a plurality of pairs of switches, each of said switches being movable between circuit opening position and circuit closing position, each of said end terminals of said secondary windings being respectively connected to one side of a different pair of said plurality of pairs of switches; three saturable reactors, each of said three reactors being connected respectively, between one of said end terminals of each of said secondary windings and its respective pair of switches; means for moving each of said switches between circuit opening and circuit closing positions in synchronism with said three-phase current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

7. An arrangement for mechanically converting an alternating current into direct current comprising, in combination, a transformer having primary windings connected in polyphase and secondary windings connected in single phase, each of said secondary windings respectively having two opposite end terminals; a set of resistors, each of said resistors having a substantially high resistance which is equal to the resistance of the other resistors, each of said resistors also being respectively connected between the midpoint of one of said secondary windings and a common junction point of said resistors to form a six-phase bridge connection; a plurality of pairs of switches, each of said switches being movable between circuit opening position and circuit closing position each of said end terminals of said secondary windings being respectively connected to one side of a different pair of said plurality of pairs of switches; a plurality of saturable reactors, each of said reactors being connected respectively, between one of said end terminals of each of said secondary windings and its respective pair of switches; a group of capacitors, each of said capacitors being respectively connected between the two pairs of switches connected to the same one of said secondary windings; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

8. An arrangement for mechanically converting an alternating current into direct current comprising, in combination, a transformer having primary windings connected in polyphase and secondary windings connected in single phase, each of said secondary windings respectively having two opposite end terminals; electrical impedance means connected in circuit with at least a portion of each of said secondary windings to form a six-phase bridge connection; a plurality of pairs of switches, each of said switches being movable between circuit opening position and circuit closing position, each of said end terminals of said secondary windings being respectively connected to one side of a different pair of said plurality of pairs of switches; a plurality of saturable reactors, each of said reactors being connected respectively, between one of said end terminals of each of said secondary windings and its respective pair of switches; a plurality of overload circuit breakers, each of said circuit breakers being respectively connected in circuit between one of said saturable reactors and its respective end terminal for opening the circuit of its respective secondary winding in the event of an overload of current therein; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

9. An arrangement for mechanically converting an alternating current into direct current comprising, in combination, a transformer having primary windings connected in polyphase and secondary windings connected in single phase, each of said secondary windings respectively having two opposite end terminals; a set of resistors, each of said resistors having a substantially high resistance which is equal to the resistance of the other resistors, each of said resistors also being respectively connected between the midpoint of one of said secondary windings and a common junction point of said resistors to form a six-phase bridge connection; a plurality of pairs of switches, each of said switches being movable between circuit opening position and circuit closing position, each of said end terminals of said secondary windings being respectively connected to one side of a different pair of said plurality of pairs of switches; a plurality of saturable reactors, each of said reactors being connected respectively, between one of said end terminals of each of said secondary windings and its respective pair of switches; a group of capacitors, each of said capacitors being respectively connected between the two pairs of switches connected to the same one of said secondary windings; a plurality of overload circuit breakers, each of said circuit breakers being respectively connected in circuit between one of said saturable reactors and its respective end terminal for opening the circuit of its respective secondary winding in the event of an overload of current therein; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

10. An arrangement for mechanically converting an alternating current into direct current comprising, in combination, a transformer having primary windings connected in delta connection and secondary windings connected in single phase, each of said secondary windings respectively having two opposite end terminals; electrical impedance means connected in circuit with at least a portion of each of said secondary windings to form a six-phase bridge connection; a plurality of pairs of switches, each of said switches being movable between circuit opening position and circuit closing position, each of said end terminals of said secondary windings being respectively connected to one side of a different pair of said plurality of pairs of said plurality of pairs of switches; a plurality of saturable reactors, each of said reactors being connected respectively, between one of said end terminals of each of said secondary windings and its respective pair of switches; means for moving each of said switches between circuit opening and circuit closing positions in synchronism with said alternating current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

11. An arrangement for mechanically converting a three-phase current into direct current comprising, in combination, a transformer having three primary windings connected in delta connection and three secondary windings connected in single phase, each of said secondary windings respectively having two opposite end terminals; a set of resistors, each of said resistors having a substantially high resistance which is equal to the resistance of the other resistors, each of said resistors also being respectively connected between the midpoint of one of said secondary windings and a common junction point of said resistors to form a six-phase bridge connection; a plurality of pairs of switches, each of said switches being movable between circuit opening position and circuit closing position, each of said end terminals of said secondary windings being respectively connected to one side of a different pair of said plurality of pairs of switches; three saturable reactors, each of said three reactors being connected respectively, between one of said end terminals of each of said secondary windings and its respective pair of switches; a group of capacitors, each of said capacitors being respectively connected between the two pairs of switches connected to the same one of said secondary windings; means for moving each of said switches between circuit opening and circuit closing positions in synchronism with said three-phase current to be rectified and the respective phase position of the secondary winding to which the respective switch is connected, one of said switches of each of said pairs of switches being moved into circuit closing position when the other switch of its respective pair is in circuit opening position and vice versa; a pair of direct current output terminals; and means for connecting the other side of one switch of each of said pairs of switches to one of said output terminals and the other side of the other switch of said pairs of switches to said other output terminal.

References Cited in the file of this patent

UNITED STATES PATENTS

| | | |
|---|---|---|
| 2,179,337 | Leukert | Nov. 7, 1939 |
| 2,310,792 | Koppelmann et al. | Feb. 9, 1943 |
| 2,697,198 | Schmidt et al. | Dec. 14, 1954 |

FOREIGN PATENTS

| | | |
|---|---|---|
| 217,879 | Switzerland | June 16, 1942 |
| 723,928 | Germany | Aug. 13, 1942 |
| 877,414 | France | Dec. 7, 1942 |